(12) United States Patent
Ashley (10) Patent No.: US 11,761,581 B1
(45) Date of Patent: Sep. 19, 2023

(54) BURN BARRIER UNIT FOR USE BETWEEN GAS CONTAINERS

(71) Applicant: Danny W. Ashley, Metter, GA (US)

(72) Inventor: Danny W. Ashley, Metter, GA (US)

( * ) Notice: Subject to any disclaimer, the term of this patent is extended or adjusted under 35 U.S.C. 154(b) by 324 days.

(21) Appl. No.: 17/035,486

(22) Filed: Sep. 28, 2020

(51) Int. Cl.
| | |
|---|---|
| *F16P 1/02* | (2006.01) |
| *B32B 7/08* | (2019.01) |
| *B32B 15/01* | (2006.01) |
| *B32B 7/05* | (2019.01) |

(52) U.S. Cl.
CPC ................ *F16P 1/02* (2013.01); *B32B 7/05* (2019.01); *B32B 7/08* (2013.01); *B32B 15/011* (2013.01); *B32B 2307/3065* (2013.01)

(58) Field of Classification Search
CPC . F16P 1/02; B32B 7/08; B32B 15/011; B32B 2307/3065; B32B 3/02; B32B 3/04; B32B 3/06; B32B 3/08; B32B 7/05; Y10T 428/24777
See application file for complete search history.

(56) References Cited

U.S. PATENT DOCUMENTS

| | | |
|---|---|---|
| 6,783,054 B1 | 8/2004 | Pregeant, Jr. et al. |
| 7,091,848 B2 | 8/2006 | Albarado |
| 8,947,249 B1 | 2/2015 | Dore et al. |
| 2009/0199973 A1 | 8/2009 | Watters |

FOREIGN PATENT DOCUMENTS

| | | | | |
|---|---|---|---|---|
| CN | 2898242 Y | * | 5/2007 | |
| DE | 10200702 A1 | * | 7/2003 | ........... A47B 96/201 |
| JP | 2002174082 A | * | 6/2002 | |
| JP | 2004176327 A | * | 6/2004 | |
| JP | 2008163550 A | * | 7/2008 | |
| JP | 2013104293 A | * | 5/2013 | |

OTHER PUBLICATIONS

[NPL-1] Tomiyama (JP 2004-176327 A); Jun. 2004 (EPO machine translation to English). (Year: 2004).*
[NPL-2] Kimura (JP 2002-174082 A); Jun. 2002 (EPO machine translation to English). (Year: 2002).*

(Continued)

*Primary Examiner* — Frank J Vineis
*Assistant Examiner* — Donald M Flores, Jr.
(74) *Attorney, Agent, or Firm* — Suzanne Kikel (57) ABSTRACT

A burn barrier unit used between gas canisters in a work area. The unit has two spaced-apart panels defining a side opening. First, second, and third flap portions of the two panels are bent 90 degrees and are overlapped and welded together to form a closed top and bottom unit. Optionally, the first and second flap portions of the panels are bent 180 degrees inwardly of the panels and the third flap portions of the panels are overlapped and welded together to form an opened top and bottom burn barrier unit. An anchor bar is welded in the side opening and has spaced-apart slots for securing an anchor element, which securely positions the unit in place between the gas canisters. The unit meets OSHA standards, is at least five feet high, and is made of carbon steel with fire resistant capabilities. Methods for forming the unit are also disclosed.

13 Claims, 11 Drawing Sheets

(56) References Cited

OTHER PUBLICATIONS

[NPL-3] Waku (JP 2008-163550 A); Jul. 2008 (EPO machine translation to English). (Year: 2008).*
[NPL-4] Imuta (JP 2013-104293 A); May 2013 (EPO machine translation to English). (Year: 2013).*
[NPL-5] Feng (CN 2898242 Y); May 2007 (EPO machine translation to English). (Year: 2007).*
[NPL-6] Haberl (DE 10200702 A1) (closest equivalent to DE 10200702 B4); Jul. 2003 (EPO machine translation to English). (Year: 2003).*

* cited by examiner

BURN BARRIER UNIT FOR USE BETWEEN GAS CONTAINERS

BACKGROUND OF THE INVENTION

1. Field of the Invention

The present invention relates, in general, to burn barriers, and more particularly, to a burn barrier which is used to separate combustible gas bottles or containers.

2. Brief Description of the Prior Art

Conducting "hot work" such as welding, cutting, or grinding generates heat and sparks. In certain environments, hot working can be extremely hazardous, especially where there are combustible gases, such as hydrocarbons; for example, on oil/gas production rigs and facilities, oil refineries, chemical plants, and the like.

Hot work, such as welding, at facilities where flammable and combustible materials are present is extremely dangerous and is regulated by the appropriate governmental agency. In the case of offshore platforms, hot work is regulated by the Mineral Management Service (MMS). In the case of a pipeline, pumping stations and associated facilities, hot work is regulated by the Department of Transportation (DOT). In the case of refineries and chemical plants, hot work is regulated by the Occupational Burn and Health Administration (OSHA). Regulations stipulate that hot work cannot be performed in or on any of these aforesaid facilities within 20 to 35 feet from the point of impact where slag, sparks or other burning substances can fall onto or in the vicinity of a storage area of a container or canister holding flammable or combustible materials. As such, the canisters must be protected by some type of barrier that restrains burning for up to 30 minutes. Also, hot work cannot be performed within 10 feet of a pressurized pipe or vessel containing flammable or combustible material in or on any of the aforesaid facilities.

In some cases, the hot work operation can be setup in a safe area and the items to be hot worked can be brought to this safe area; hot worked; and then returned to their original location. In most cases it is not practical, from a strategic nor from an economic point of view, to set up a remote hot work location at a distance away from the object to be hot worked. In the past, a facility, such as a petroleum production platform, would have to be shut down during hot work operations. Furthermore, a section of pipe or vessel in a petroleum refinery or chemical plant would have to be purged and cleaned of flammable and combustible material before any hot work could be performed within 10 feet of it. This has created a substantial financial burden for the operator of the platform, refinery, or plant.

A welding habitat has been developed within the last few years wherein a temporary building is constructed around the object to be welded. This habitat, also referred to as an enclosure, is equipped with gas monitors that will automatically signal a shutdown of all welding equipment when a predetermined concentration level of flammable or combustible gas is reached. For example, U.S. Pat. No. 6,783,054 to Pregeant Jr. et al. discloses a system for conducting welding adjacent to the flammable materials on an offshore platform. This system contains an enclosed chamber having a blower and sensors, each of which monitors a single gas, typically a combustible gas, and this system has the ability to automatically shut down the welding operation if a predetermined unacceptable concentration of a combustible gas is detected by one or more sensors.

The prior art, in general, contains units that are designed as two-wheel carts which do not fit into many work place situations.

There is a need, therefore, in the art for a burn barrier unit which may be used in conjunction with compressed gases and which unit can be easily and expeditiously set up in a hot work facility between canisters or containers containing compressed gases.

There is a further need in the art for a method for forming a burn barrier unit which can be used in conjunction with canisters or containers containing compressed gases.

SUMMARY OF THE INVENTION

The present invention meets such needs. The present invention provides a burn barrier unit for use as a shield in connection with canisters of flammable gas, and which unit may be located between oxy-acetylene bottles, for example, and in a work area, and which burn barrier unit is designed to protect the work area in case of bottle fire.

The burn barrier unit of the invention is comprised of a first panel having a planar body which includes a first end edge, a second end edge, a first side edge, a second side edge, a longitudinal axis extending between the first end edge and the second end edge, an axial length measured along the longitudinal axis from the first end edge to the second end edge, a transverse axis extending between the first side edge and the second side edge, and a transverse width dimension measured along the transverse axis from the first side edge to the second side edge. A first notch is located adjacent to the first end edge and the first side edge, and a second notch is located opposite to the first notch and adjacent to the second end edge and the first side edge, the first and second notches being equal in size. These notches allow the first panel to be formed such that it is comprised of a first flap portion along its transverse axis, a second flap portion along its transverse axis and opposite to the first flap portion, and a third flap portion along its longitudinal axis. The third flap portion is adjacent to the first and second flap portions.

The burn barrier unit further comprises a second panel having a planar body which includes a first end edge, a second end edge, a first side edge, a second side edge, a longitudinal axis extending between the first end edge and the second end edge, an axial length dimension measured along the longitudinal axis from the first end edge to second end edge, a transverse axis extending between the first side edge and the second side edge, and a transverse width dimension measured along the transverse axis from the first side edge to the second side edge. A first notch is located adjacent to the first end edge and the first side edge, and a second notch is located adjacent to the second end edge and the first side edge and is opposite to the first notch. These notches are equal in size. These notches allow the second panel to be formed such that is comprised of a first flap portion along its transverse axis, a second flap portion along its transverse axis and opposite to the first flat portion, and a third flap portion along its longitudinal axis and adjacent to the first and second flap portions.

The first and second panels containing the aforesaid first flap portion, second flap portion, and third flap portion are equal in axial length and in transverse width dimensions, and are securely connected together, such as, for example, welded along the flap portions thereof. In an arrangement of the two panels, the first flap portion, the second flap portion, and the third flap portion of each panel are bent 90 degrees. The two panels are then nested together such that the second side edges of each panel forms a longitudinal opening; and the first flap portion of the first panel overlaps with the first flap portion of the second panel; the second flap portion of the first panel overlaps with the second flap portion of the second panel; and the third flap portion of the first panel overlaps with the third flap portion of the second panel. The first, second and third flap portions of each panel are connected, via welding, to each other such that the panels are located in planes that are parallel to each other. The two panels are connected such that they are co-extensive along the longitudinal axis of the panels and co-extensive along the transverse axis of the panels, whereby the top and the bottom of the burn barrier unit are closed along the transverse axis 60 of the panels, with the second side edges of each panel being opened to receive and support an anchor bar thereby enclosing the unit.

In an alternate arrangement of the two panels, the third flap portion of the first panel and the third flap portion of the second panel are bent 90 degrees. The first flap portion of the first panel and the first flap portion of the second panel are bent 180 degrees. The second flap portion of the first panel and the second flap portion of the second panel are bent 180 degrees. The two panels are nested together such that the third flap portions of the panels are welded. The first flap portions and the second flap portions of the panels being bent 180 degrees extend parallel to the longitudinal axis of the panels such that when the panels are welded together at the third flap portions thereof, the top and the bottom of the burn barrier unit are opened along the transverse axis of the panels.

The planar bodies of the two panels are spaced apart from each other such that a longitudinal opening is formed along the longitudinal length of the second side edge of each panel. An anchor bar is received in the longitudinal opening and is securely attached, via welding, to the second side edge of each panel. The anchor bar is a flat piece of carbon steel measuring approximately 1 inch wide and ¼" thick, and has at least two slots defined therein. The anchor bar is used to secure an anchor element in each of its slots. The anchor elements securely attach the burn barrier unit to a support, such as to a handrail or pole. Each anchor element is designed to freely slide up and down along its respective slot for a desired positioning of the anchor element relative to the burn barrier unit and relative to the support which is used to position the burn barrier unit between compressed gas canisters in a hot work environment.

The two panels are made of a steel, which may be, for example, A36 mild steel plate. The anchor elements are scaffold knuckles and are made of a hard steel. Each panel has a length of approximately 64 inches and a width of approximately 13 inches; and the anchor bar is welded to the second side edge of each panel and is made of hard steel.

A further embodiment of the invention relates to a method for forming the burn barrier unit. The burn barrier unit comprises a rectangular enclosure and has anchor elements for attaching the burn barrier unit to a support. A handle is attached to the unit for easy transporting of the burn barrier unit.

These and other features and advantages of the present invention will be better appreciated and understood when the following description is read in light of the accompany drawings.

BRIEF DESCRIPTION OF THE DRAWINGS

The components in the figure are not necessarily to scale, emphasis instead being place upon illustrating the principles of the invention. Moreover, in the figures, like referenced numerals designate corresponding parts throughout the different views.

DETAILED DESCRIPTION OF THE INVENTION

Figure 1:
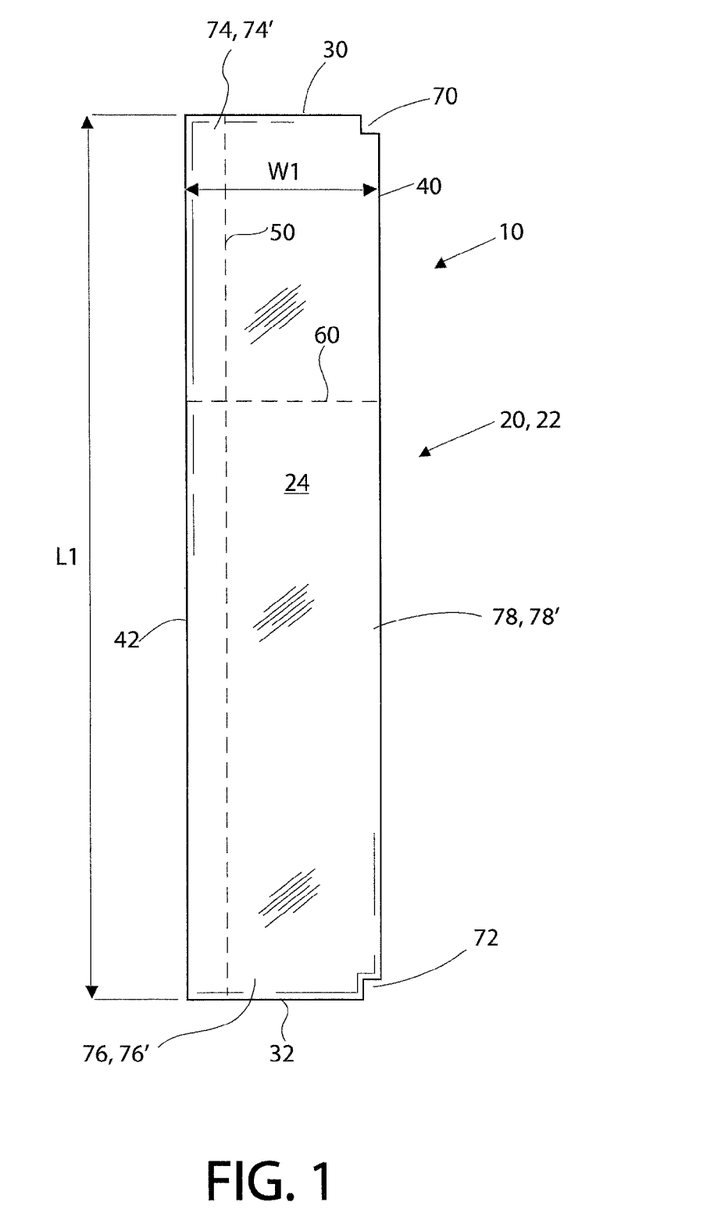
FIG. 1 is an elevational view illustrating two panels of the burn barrier unit of the invention prior to the panels being connected together.
Figure 2:
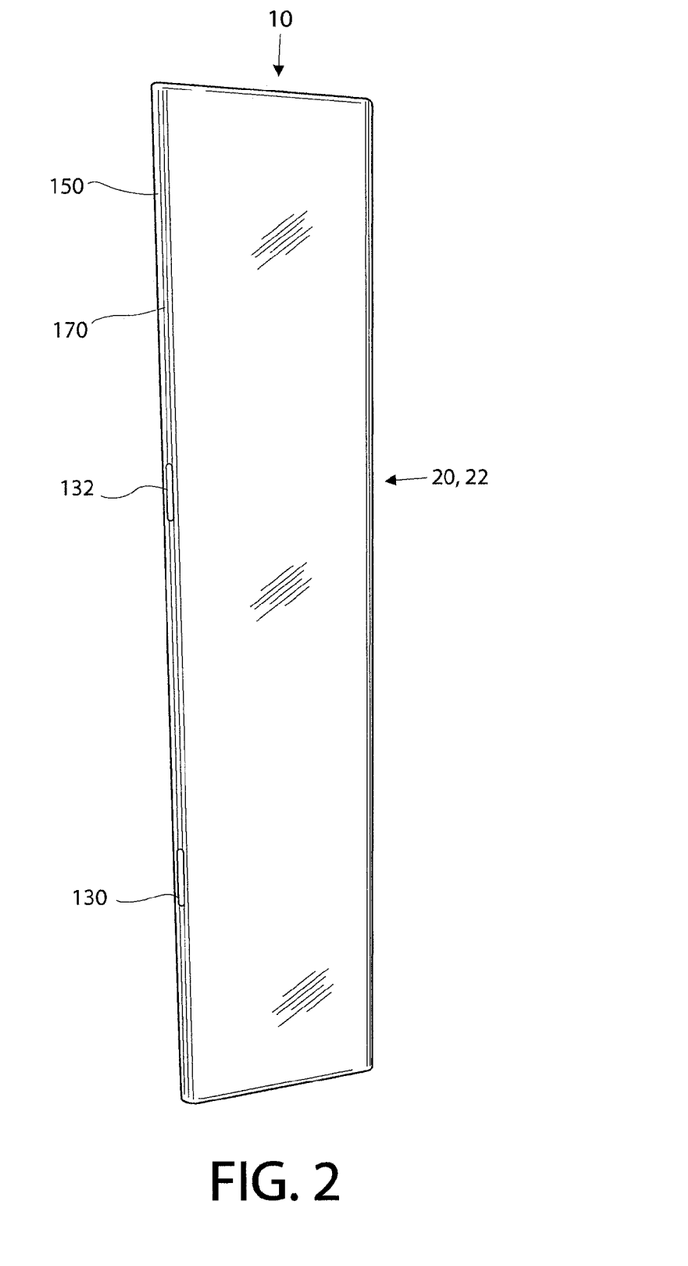
FIG. 2 is a front perspective view illustrating the two panels of the burn barrier unit of the invention connected together.

With reference to FIGS. 1 through 9, a burn barrier unit 10 for particular use as a shield between two compressed gas canisters G1 and G2 (FIG. 9) is shown. The burn barrier unit 10 meets OSHA Standards with respect to compressed gas bottles and can be used to separate gas bottles with a burn barrier having a fire-resistance rating of at least one-half hour and is at least five feet high. With particular reference to FIG. 1, the burn barrier unit 10 of the present invention comprises a first panel 20 and a second panel 22. Both panels 20, 22 are particularly shown in FIG. 7. It is to be understood that both panels 20, 22 are identical and the description of panel 20 also applies to panel 22. In the invention, panels 20, 22 are one piece. Preferably, panels 20, 22 are made of carbon steel; such, as for example, A36 mild steel.

Figure 3:
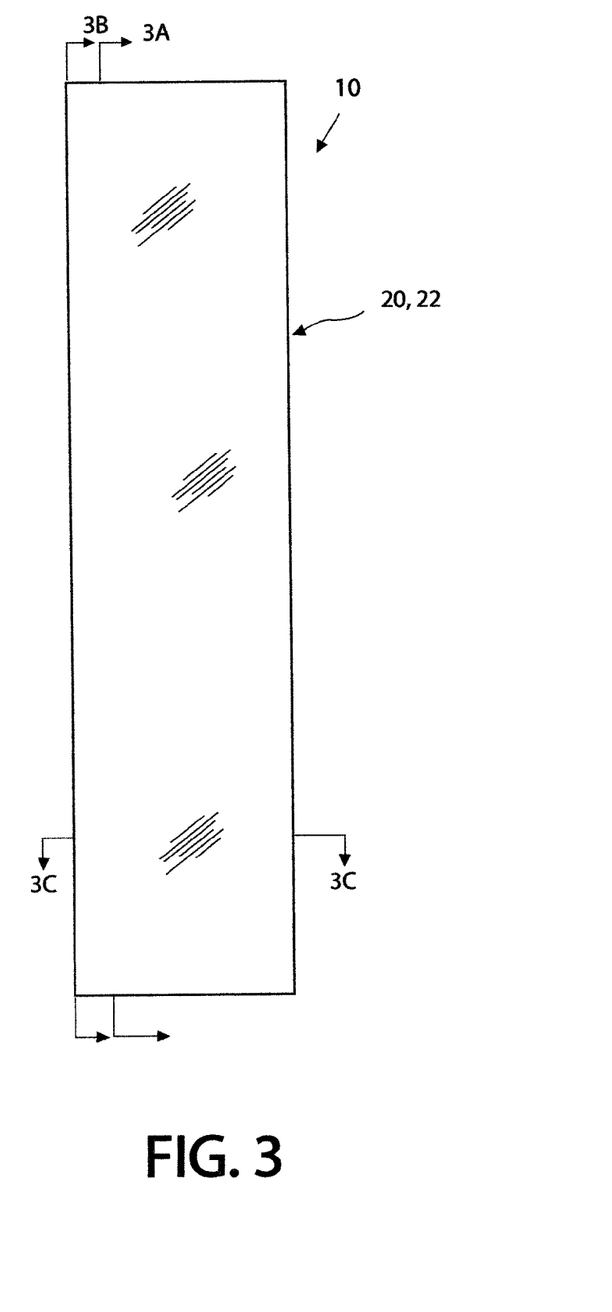
FIG. 3 is a front elevational view of the two panels of the burn barrier unit of the invention connected together.
Figures 3A, 3C:
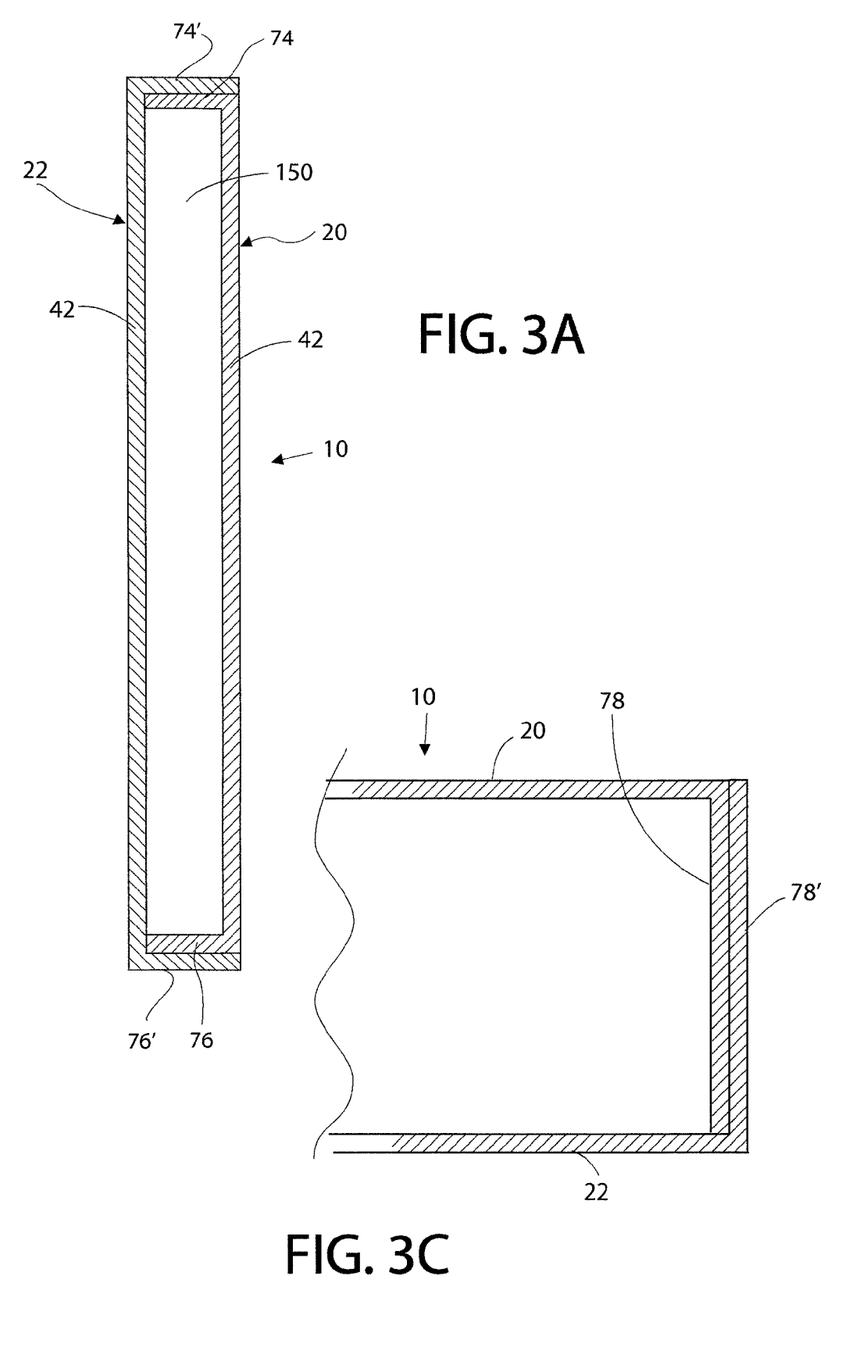
FIG. 3A is a cross-sectional view taken along lines 3A-3A of FIG. 3.
FIG. 3C is an enlarged cross-sectional view taken along lines 3C-3C of FIG. 3.

With particular reference to FIGS. 1 and 3A, panels 20, 22 comprises a planar body 24 having a first end edge 30; a second end edge 32; a first side edge 40; a second side edge 42; and a longitudinal axis 50 extending between the first end edge 30 and the second end edge 32. As best shown to the left in FIG. 1, the axial length L1 of panels 20, 22 measures approximately 64 inches from the first end edge 30 to the second end edge 32.

Still referring to FIG. 1, panels 20, 22 further comprise a transverse axis 60 extending between the first side edge 40 and the second side edge 42. Transverse axis 60 has a width dimension W1 of approximately 14 inches. Panels 20, 22 further comprise a first notch 70 located adjacent to the first end edge 30, and a second notch 72 located adjacent to the second end edge 32. Both first notch 70 and second notch 72 are equal in size, i.e. about 1 inch long and 1 inch wide; and are substantially rectangular in shape. Since the axial length L1 of panels 20, 22 is approximately 64 inches, this dimension allows burn barrier unit 10 to be oriented such that the longitudinal axis 50 is upright and the burn barrier unit 10 is at least five feet high which is in compliance with OSHA requirements.

Referring particularly to FIGS. 1, 3A, 3B and 3C, the first end edge 30 of first panel 20 with first notch 70 forms a first flap portion 74, and is bent 90 degrees relative to the planar body 24 of panel 20 to extend outwardly from the planar body 24 of panel 20; the second end edge 32 of panel 20 with second notch 72 forms second flap portion 76 and is bent 90 degrees relative to the planar body 24 of panel 20 to extend outwardly from the planar body 20; and the first side edge 40 of panel 20 with first notch 70 and second notch 72 forms a third flap portion 78 which is bent 90 degrees relative to the planar body 24 of panel 20 to extend outwardly along the longitudinal axis of panel 20. This forming of panel 20 results in a panel having three outwardly extending flap portions 74, 76, and 78 for panel 20. First flap portion 74 and second flap portion 76 are transverse portions and are spaced apart from each other, and the third flap portion 78 is a longitudinal portion and is located at its opposed ends adjacent to first flap portion 74 and second flap portion 76. The dimensions of panel 20 in this form is now approximately 62 inches along the longitudinal axis and approximately 13 inches along the transverse axis of panel 20.

Still referring to FIGS. 1, 3A, 3B, and 3C, the first end edge 30 of second panel 22 with first notch 70 form a first flap portion 74' which is bent 90 degrees relative to the planar body 24 of panel 22 to extend outwardly from the planar body 24 of panel 22; the second end edge 32 of panel 22 with second notch 72 form a second flap portion 76' which is bent 90 degrees relative to the planar body 24 of panel 22 to extend outwardly from the planar body 20; and the first side edge 40 of panel 22 with first notch 70 and second notch 72 form a third flap portion 78' which is bent 90 degrees relative to the planar body 24 of panel 22 to extend outwardly along the longitudinal axis of the panel 22. This forming of panel 22 results in a panel having three outwardly extending flap portions 74', 76', and 78' for panel 22. First flap portion 74' and second flap portion 76' are transverse portions and are spaced apart from each other, and the third flap portion 78' is a longitudinal portion and is located at its opposed ends adjacent to first flap portion 74' and second flap portion 76'. The dimensions of panel 22 in this form is now approximately 62 inches along the longitudinal axis and approximately 13 inches along the transverse axis of panel 22.

With reference to FIG. 1, first notch 70 and second notch 72 of first panel 20 and second panel 22 are approximately equal in size, i.e. about 1 inch long and 1 inch wide.

Panels 20, 22 are approximately 62 inches along the longitudinal axis and approximately 13 inches along the transverse axis.

Figure 3B:
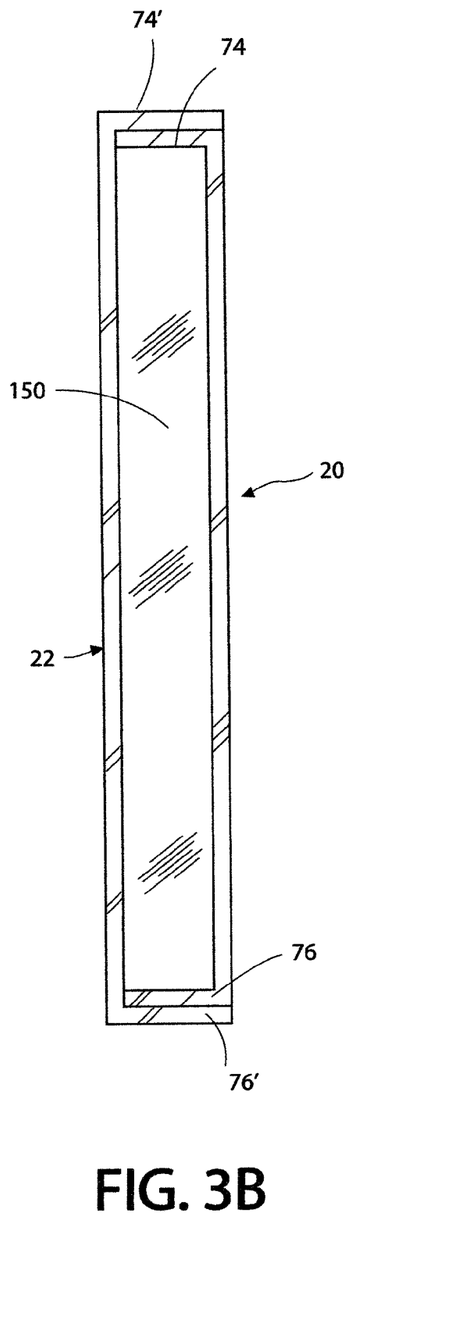
FIG. 3B is a side elevational view taken along lines 3B-3B of FIG. 3.
Figure 4:
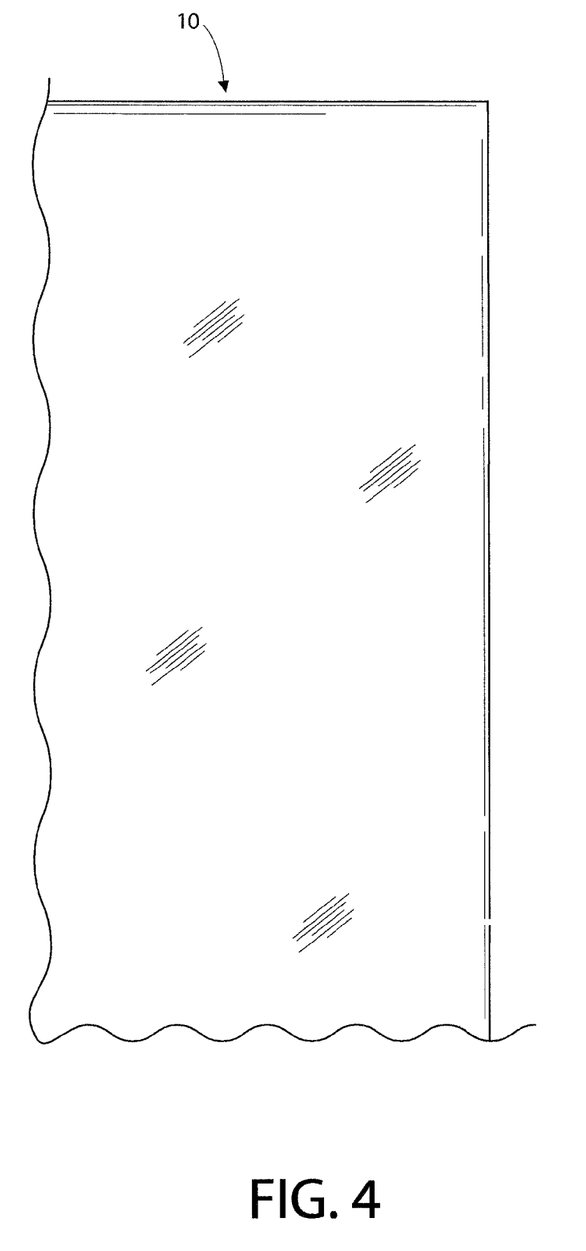
FIG. 4 is an enlarged, front elevational view of an upper corner of the burn barrier unit of FIG. 2.

With particular reference to FIGS. 3, 3A, 3B, and 3C, the resultant configurations for first panel 20 and second panel 22 with the three outwardly extending flap portions being bent 90 degrees allow panels 20, 22 to be nested together. That is, panels 20, 22 are arranged such that they face each other as best shown in FIG. 3B. Panels 20, 22 are then nested together to form the burn barrier unit 10 of the invention. In this instance, first panel 20 becomes the inner panel and the second panel 22 becomes the outer panel with the first flap portion 74' of second panel 22 overlapping the first flap portion 74 of first panel 20; the second flap portion 76' of second panel 22 overlapping the second flap portion 76 of first panel 20, and the third flap portion 78' of second panel 22 overlapping the third flap portion 78 of panel 20. Once the flap portions of each panel are in an overlapping relationship, the flap portions are then connected together, preferably, through a welding process, such as, for example, a stitch welding process. The stitch welding may be approximately 2 inches long and may be applied on the surfaces of the flap portions of the panels 20, 22 at about every 12 inches or so. The aforesaid method for forming burn barrier unit 10 results in the second side edges 42 of each panel 20, 22 forming a longitudinal opening 150 in the burn barrier unit 10, which is best shown in FIG. 3B. It is to be appreciated to one skilled in the art, that in the burn barrier unit 10 of the invention, panels 20, 22 can also be arranged relative to each other such that panel 22 is the inner panel and panel 20 is the outer panel.

As particularly shown in FIGS. 2, 3, 3A, 3B and 7, first panel 20 and second panel 22 are equal in the axial length dimensions and in the transverse width dimensions, and the first panel 20 and second panel 22 are welded together along the three flap portions of panels 20 and 22, as discussed herein above. Even though the process for connecting panels 20, 22 together is disclosed herein as being done via a welding process, it is to be appreciated that other suitable processes may be used in the invention.

Figure 5:
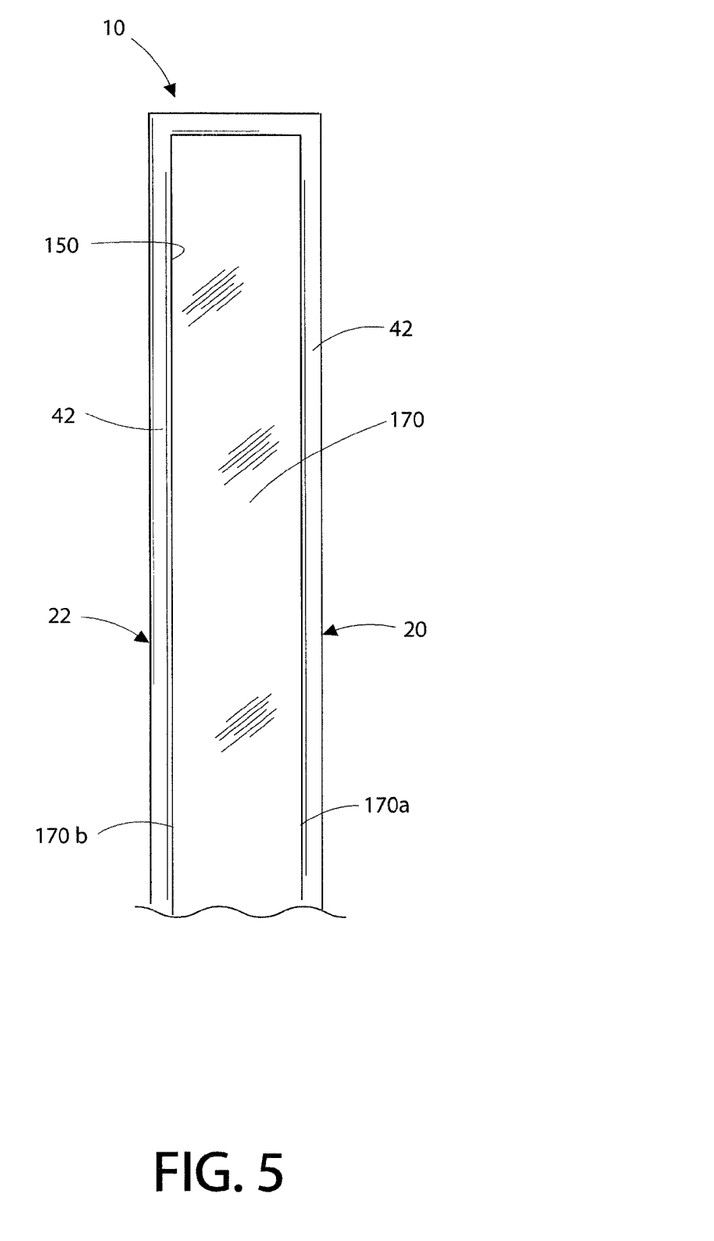
FIG. 5 is an enlarged, side elevational view of the formed two panels of the burn barrier unit with an anchor bar therebetween.

With particular reference to FIG. 3B, when first panel 20 and second panel 22 are securely fastened together, they form a longitudinal opening 150 down along the second side edge 42 of each panel 20, 22. With reference to FIG. 5, opening 150 receives an anchor bar 170 which has slots 130, 132 (FIG. 2) for securing an anchor element 190 therein, as particularly illustrated in FIG. 7.

In an embodiment of the invention, the first flap portion 74 of first panel 20 is connected to the first flap portion 74' of second panel 22; the second flap portion 76 of first panel 20 is connected to the second flap portion 76' of second panel 22; and the third flap portion 78 of first panel 20 is connected to the third flap portion 78' of second panel 22 to form a rigid, sturdy construction for burn barrier unit 10.

As shown in FIGS. 3A and 3B, first panel 20 and second panel 22 are each located in planes that are parallel to each other. First and second panels 20, 22 are attached together such as to be co-extensive with each other along the longitudinal axes of the panels (FIG. 2) and to be co-extensive with each other along the transverse axis 60 (FIG. 1) of the panels. In the burn barrier unit 10, the first flap portions 74, 74' of first and second panels 20, 22, respectively, are welded together; the second flap portions 76, 76' of first and second panels 20, 22, respectively are welded together; and the third flap portions 78, 78' of first and second panels 20, 22 respectively are welded together so that panels 20, 22 are congruent with each other.

As discussed herein above, panels 20, 22 are connected together such that the second side edge 42 of each panel forms opening 150 for receiving anchor bar 170 which is constructed and arranged to cover the entire opening 150 (FIG. 3B) such that panels 20, 22 form an enclosure for burn barrier unit 10. Anchor bar 170 is an elongated piece of flat metal bar that extends the entire length of opening 150. Anchor bar 170 measures approximately 62 inches long which equals the overall length of burn barrier unit 10. Additionally, anchor bar 170 is approximately 1 inch wide and about ¼ inch thick, and is welded along the second side edge 42 of each panel 20, 22. Such welding is about 2 inches long and occurs every 12 inches along the length of anchor bar 170.

Referring again to FIG. 2, anchor bar 170 has spaced-apart slots 130 and 132 along its length. Slots 130, 132 are approximately ⅝' wide and about 3 inches long. Slot 130 may be located about 20 inches up from the bottom of anchor bar 170, and slot 132 may be located about 41 inches up from the bottom of anchor bar 170.

Figure 6:
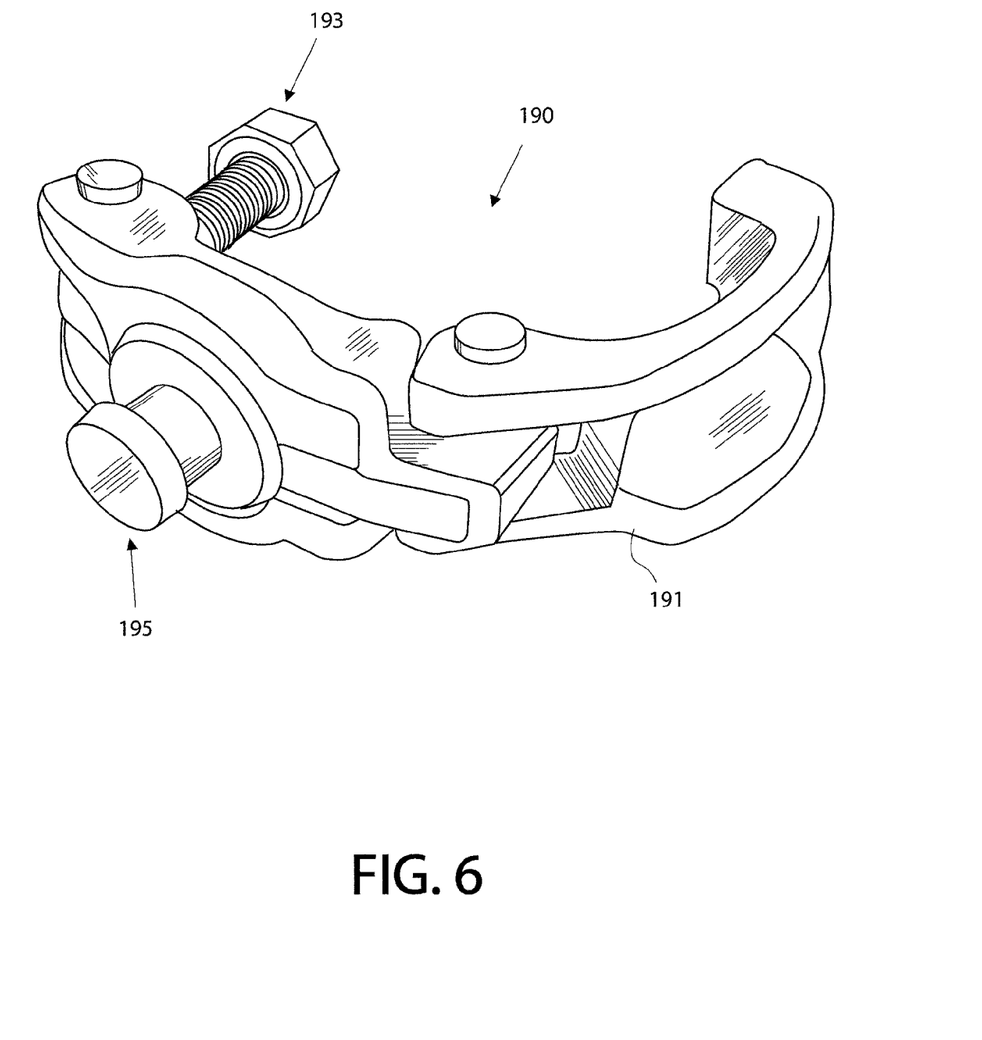
FIG. 6 is an enlarged perspective view of an anchor element used to attach the burn barrier unit of the invention to a support.
Figure 7:
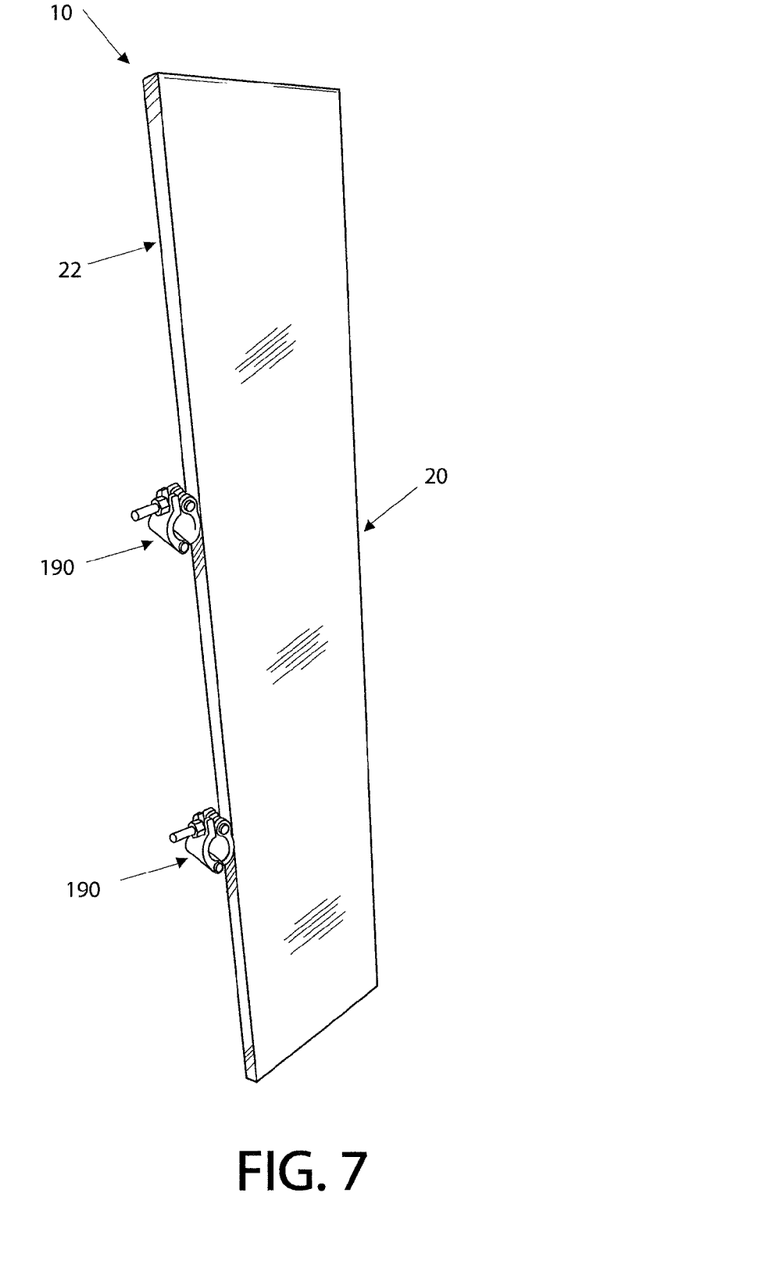
FIG. 7 is a front perspective view of the burn barrier panel unit illustrating anchor elements therein.
Figure 8:
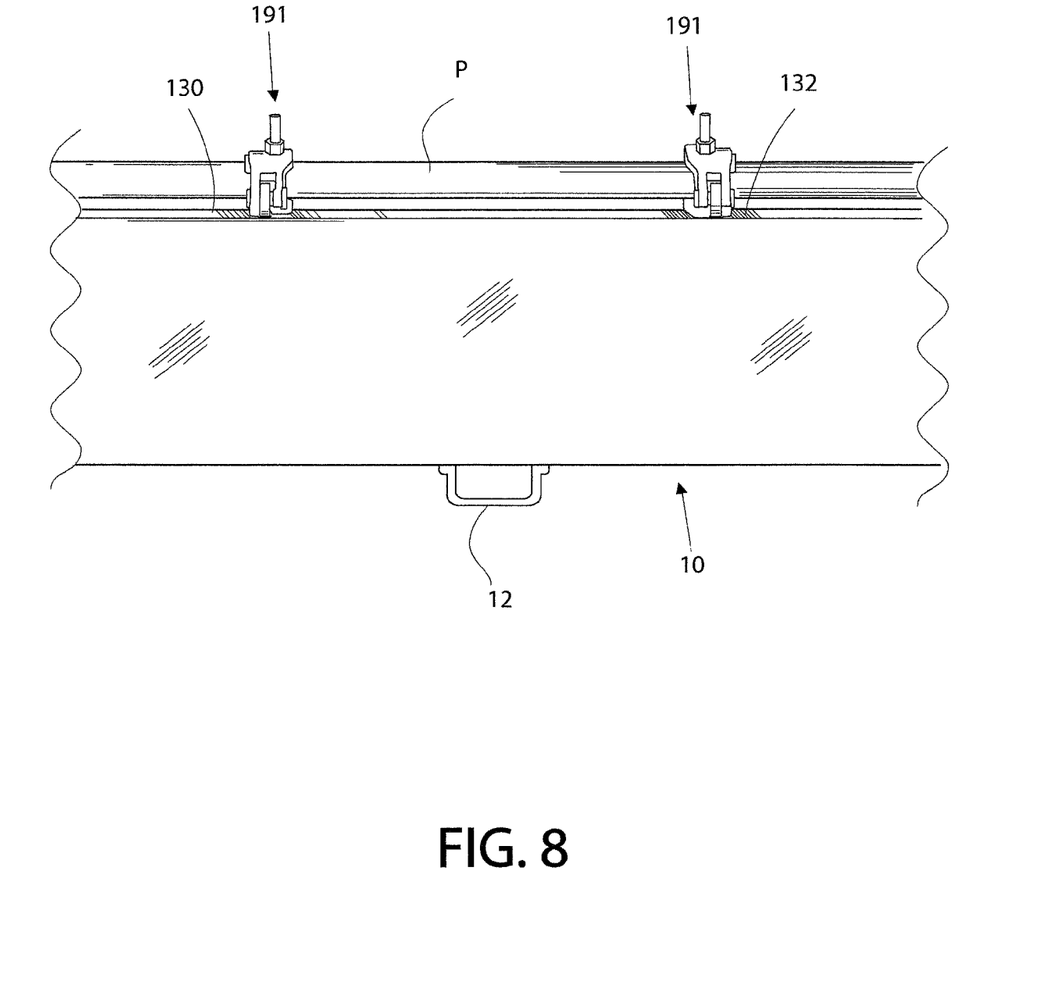
FIG. 8 is an enlarged, partial elevational view of the burn barrier unit of the invention in a horizontal positioning and attached to a support.
Figure 9:
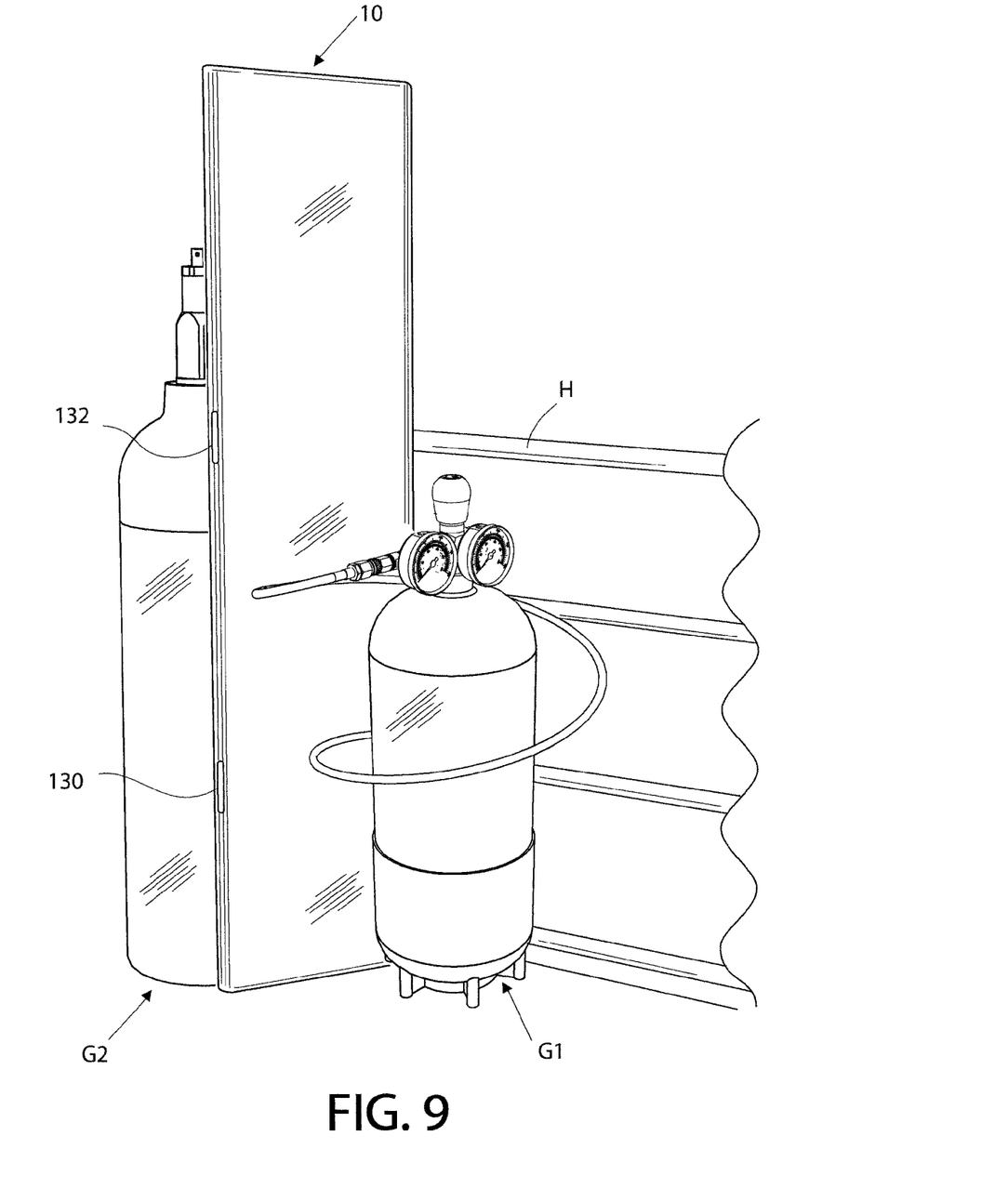
FIG. 9 is a perspective view of the burn barrier unit of the invention in a vertical positioning in use between two compressed gas containers.

With particular reference to FIGS. 7, 8 and 9, at least two anchor elements 190 are secured in burn barrier unit 10, more about which is discussed herein below. Anchor elements 190 may be scaffold knuckle units, such as those illustrated in FIG. 6. In FIG. 6, one such anchor element 190 is in an open position in preparation for insertion of its swingable arm 191 around a support handrail H (FIG. 9) or around a pole P (FIG. 8). FIG. 9 illustrates the burn barrier unit 10 of the invention in a vertical positioning in use between two compressed gas containers G1 and G2. It is to be appreciated that in FIG. 9, anchor elements 190 have not yet been provided in slots 130, 132, and that, once they have been inserted, burn barrier unit 10 will be rotated vertically 180 degrees such that anchor elements 190 can be attached to handrail H. For ease in transporting burn barrier unit 10, a handle 12 is provided as shown in FIG. 8.

As shown in FIG. 6, anchor element 190 consists of a swingable arm 191, a first bolt assembly 193, and a second bolt assembly 195. As is apparent from FIGS. 7 and 8, anchor elements 190 are used to secure burn barrier unit 10 to a support via operation of swingable arm with first bolt 193. Second bolt assembly 195 is used to attach each anchor element 190 to anchor bar 170, preferably prior to the anchor bar 170 being inserted opening 150 and welded to second side edge 42 of each panel 20, 22. On the other hand, second bolt assembly 195 may first be unscrewed from anchor element 190, and then inserted into a respective slot 130, 132 in anchor bar 170, and slide up and down within its respective slot 130, 132 for a desired location of anchor element 190 relative to burn barrier unit 10. Once in the desired location within slot 130, 132 is achieved, the second bolt assembly 195 is tightened to securely affix anchor element 190 to anchor bar 170. It is apparent that this structure of anchor element 190 allows it to be slid up and down within its appropriate slot 130, 132 for a desired location of anchor element 190 relative to burn barren unit 10. As can be appreciated by one skilled in the art, anchor element 190 may be a scaffold knuckle, which is readily available in the market place.

With particular reference to FIG. 5, anchor bar 170 may be made of a hard metal, such as carbon steel and is attached to panels 20, 22 of barrier unit 10 through an appropriate process, such as welding whereby opposed sides 170a, 170b of anchor bar 170 are welded to the second side edge 42 of each panel 20, 22 to position and secure anchor bar 170 in opening 150 formed by panels 20, 22.

Anchor bar 170 is a 1" by ¼" flat bar, is welded to the panels 20, 22 every 12" or so, and has ⅝" wide slots such as those defined at reference numbers 130, 132 to allow each anchor element 190 via second bolt assembly 195 to slide for adjustment along a support for a predetermined positioning of the burn barrier unit 10 relative to the support. As particularly illustrated in FIG. 9, anchor element 190 may be fastened to a hand railing H (FIG. 9) or to a pole P (FIG. 8) or the like, to position the burn barrier unit 10 between gas containers G1 and G2 as required by OSHA requirements.

Panels 20, 22 and anchor bar 170 of burn barrier unit 10 are made of a hard metal, preferably, carbon steel which has the first resistant capabilities, that is, restrains burn up to 30 minutes. Burn barrier unit 10 is versatile; it can be located wherever it is most convenient; and it is easily maneuvered into positions and locations which are, in general, inaccessible to carts which are currently being used in the art. The burn barrier unit 10 may be positioned between oxy-acetylene containers or canisters and in a work area for protection of the work area in case of fire.

As disclosed hereinabove, the length of burn barrier unit 10 is approximately 62 inches, the width is approximately 13 inches, and the thickness is about 1 inch. These dimensions are such that the burn barrier unit 10 meets the OSHA standard for a noncombustible barrier for used between compressed gas bottles. That is, the OSHA standard for a noncombustible barrier is a barrier being at least five feet high and having a fire-resistance rating of at least one-half hour. There are several places in a boiler house (power plant) that this criteria for a noncombustible barrier holds true. Preferably, the burn barrier unit 10 is used in a work area which has a pole or hand rail for securely positioning burn barrier unit 10 via anchor elements 190 between compressed gas bottles. It is also to be appreciated that the aforesaid dimensions of the burn barrier unit 10 of the invention may vary except that the length of the unit must be at least five feet in order to meet OSHA standards.

The invention also involves methods for forming a burn barrier unit. The method comprises the steps of: providing a first panel 20 having a planar body 24 with a first end edge 30, a second end edge 32, a first side edge 40, a second side edge 42, a longitudinal axis 50 extending between the first end edge and the second end edge, an axial length measured along the longitudinal axis from the first end edge 30 to the second end edge 32, a transverse axis 60 extending between the first side edge 40 and the second side edge 42, a first notch 70 located adjacent to the first end edge 30 and the first side edge 40, and a second notch 72 located adjacent to the second end edge 32 and the first side edge 40, the first notch 70 and the second notch 72 being equal in size; bending the first flap portion 74 of first panel 20 at a 90 degree angle relative to the planar body 24; bending the second flap portion 76 of the first panel 20 at a 90 degree angle relative to the planar body 24 of the first panel; bending the third flap portion 78 of first panel 20 at a 90 degree angle relative to the planar body 24 of the first panel 20; providing a second panel 22 having a planar body 24 with a first end edge 30, a second end edge 32, a first side edge 40, a second side edge 42, a longitudinal axis 50 extending between the first end edge 30 and the second end edge 32, an axial length L1 measured along the longitudinal axis 50 from the first end edge 30 to the second end edge 32, a transverse axis 60 extending between the first side edge 40 and the second side edge 42, a first notch 70 located adjacent to the first end edge 30 and the first side edge 40, and a second notch 72 located adjacent to the second end edge 32 and the first side edge 40, the first notch 70 and the second notch 72 being equal in size (about 1 inch by 1 inch); bending the first flap portion 74' of second panel 20 at a 90 degree angle relative to the planar body 24 of the second panel 22; bending the second flap portion 76' of the second panel 22 at a 90 degree angle relative to the planar body 24 of the second panel; bending the third flap portion 78' of panel 22 at a 90 degree angle relative to the planar body of the second panel; nesting the first panel 20 and the second panel 22 together such that the first flap portion 74 of first panel 20 overlaps with the first flap portion 74' of second panel 20, the second flap portion 76 of first panel 20 overlaps with the second flap portion 76' of second panel 22, and the third flap portion 78 of first panel 20 overlaps with the third flap portion 78' of second panel 22; and an opening 150 is formed along the length of the second side edges 42 of the first panel 20 and second panel 22; attaching the overlapped first flap portions 74, 74', second flap portions 76, 76', and third flap portions 78, 78' of first panels 20, 22 via a welding process.

Further steps include: providing an anchor bar 170 in the opening 150 formed between the second side edge 42 of each panel 20, 22 and welding the anchor bar 170 to the second side edge 42 of the two panels, wherein the anchor bar 170 has at least two slots 130, 132; providing a plurality of anchor elements 190, each in one of the slots 130, 132 of the anchor bar 170, wherein the anchor elements are scaffold knuckles, and wherein the anchor elements are designed to be fastened to a support, thereby affixing the burn barrier unit to the support, such as a handrail H or pole P in the work area.

In the embodiment of FIGS. 1 through 9, and as described herein above, the first flap portions 74, 74' of panels 20, 22; the second flap portions 76, 76' of panels 20, 22; and the third flap portions 78, 78' are bent 90 degrees relative to the planar body 24 thereof. The first flap portions 74, 74' of panels 20, 22 are welded together; the second flap portions 76, 76' of panels 20, 22 are welded together; and the third flap portions 78, 78' of panels 20, 22 are welded together to form a rectangular enclosure comprising first panel 20 and second panel 22. The construction of the burn barrier unit 10 of FIGS. 1 through 9 is such that unit 10 has a closed top and a closed bottom along the transverse axis 60 of panels 20, 22 to totally enclose the unit.

The burn barrier unit 10 is a rectangular enclosure made of carbon steel; measures approximately 5 to 6 feet long; about 13 to 14 inches wide, and about 2 to 3 inches thick. The anchor bar 170 is a flat metal strip being about 1 inch wide and about 4 inch thick. The anchor elements 190 are scaffold knuckles, and a handle 12 is provided for easy transport of the burn barrier unit.

Figure 10:
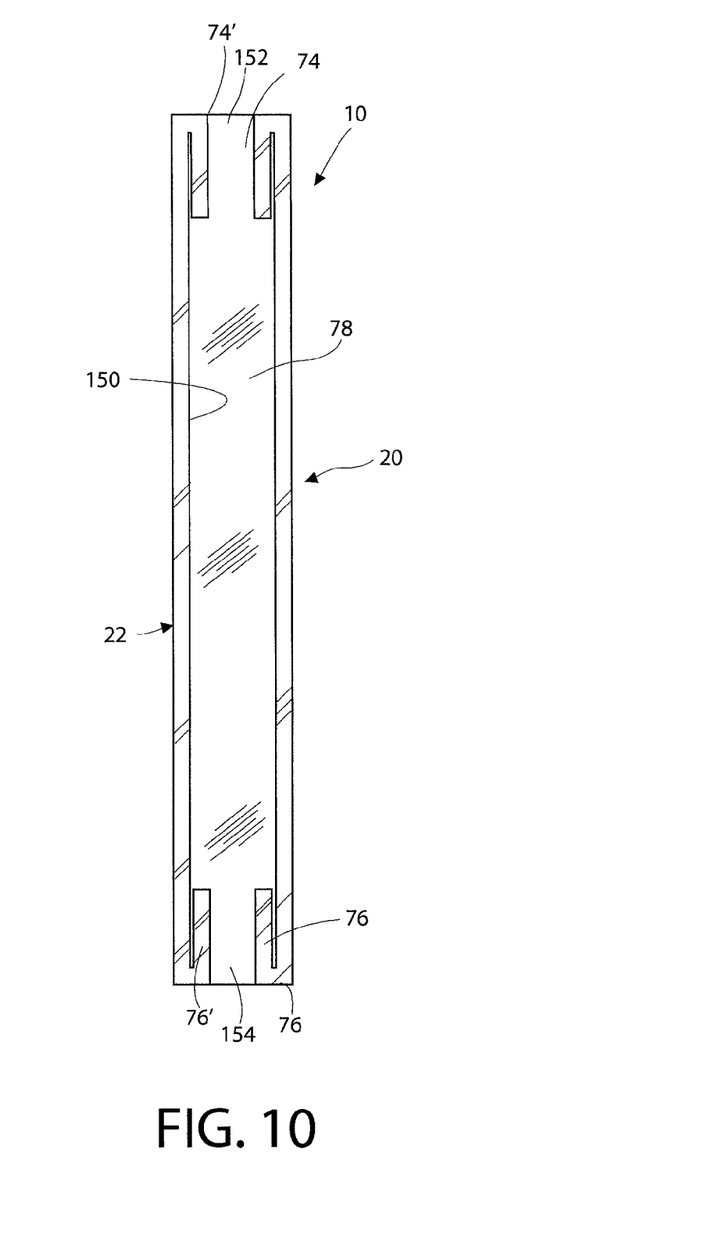
FIG. 10 is a side elevational view illustrating the two panels of the burn barrier unit in a further embodiment of the invention.

FIG. 10 illustrates a further embodiment of the invention wherein the top and bottom of the burn barrier unit 10 is opened along the transverse axis 60 of panels 20, 22 as indicated at reference numerals 152, 154 in FIG. 10. In this embodiment, the third flap portions 78, 78' of panels 20, 22 are bent 90 degrees relative to the planar body 20 of panels 20, 22, and the first flap portions 74, 74' and the second flap portions 76, 76' are bent downwardly 180 degrees relative to the planar body 24 such that first flap portions 74, 74' and second flap portions 76, 76' extend parallel to the longitudinal axis 50 of panels 20, 22. The third flap portions 78, 78' of panels 20, 22 are welded together to form a rectangular enclosure comprising first panel 20 and second panel 22. In this embodiment, and as stated herein above, the top and bottom of burn barrier unit 10 are opened as indicated at reference numerals 152, 154 in FIG. 10.

Still referring to FIG. 10, burn barrier unit 10 panels 20, 22 are welded together and form a longitudinal opening 150. Even though not shown in FIG. 10, it is to be appreciated that the burn barrier unit 10 of this embodiment comprises similar elements to that of the burn barrier unit 10 of FIGS. 1 through 9. That is, the burn barrier unit of FIG. 10 further comprises an anchor bar 170 welded within the longitudinal opening 150 formed by first panel 20 and second panel 22. Anchor bar 170 has at least two spaced-apart slots 130 and 132; and at least two anchor elements 190 are secured within one of the slots 130, 132 for positioning and securing burn barrier unit of FIG. 10 to a support.

The burn barrier unit of FIG. 10 is made of carbon steel; measures approximately 5 to 6 feet long; is about 13 to 14 inches wide, and is about 2 to 3 inches thick. Anchor bar 170 is a flat metal strip being about 1 inch wide and about ¼ inch thick. Anchor elements 190 are scaffold knuckles, and a handle 12 is provided for easy handling of the unit 10. It is also to be appreciated that when the third flap portions 78, 78' of panels 20, 22 are bent 90 degrees that the first flap portions 74, 74' and the second flap portions 76, 76' of panels 20, 22 are either bent 180 degrees either before the third flap portions 78, 78' of panels 20, 22 are welded together or after third flap portions 76, 76' of panels 20, 22 are welded together. As can be seen in FIG. 10, first flap portions 74, 74' of panels 20, 22 and second flap portions 76, 76' of panels 20, 22 are preferably arranged inwardly of the two spaced-apart panels 20, 22, that is between panels 20, 22. However, in some instances, first flap portions 74, 74' of panels 20, 22 and second flap portions 76, 76' of panels 20, 22 may be arranged outwardly of the two spaced-apart panels 20, 22. In either instance, the top and bottom of burn barrier unit 10 is opened.

While the present invention has been described in connection with a preferred embodiment of the figures, it is to be understood that other similar embodiments may be used or modifications and additions may be made to the described embodiment for performing the same function of the present invention without deviating therefrom. Accordingly, it is intended by the appended claims to cover all such changes and modifications as come within the spirit and scope of the invention.

What is claimed is:

1. A burn barrier unit for use with compressed gas containers, comprising:
   a first panel having a planar body which includes a first end edge, a second end edge, a first side edge, a second side edge, a longitudinal axis extending between the first end edge and the second end edge, an axial length dimension measured along its longitudinal axis from the first end edge to the second end edge, a transverse axis extending between the first side edge and the second side edge, a transverse width dimension measured along the transverse axis from the first side edge to the second side edge,
   the first panel having a first flap portion extending outwardly relative to its planar body and consisting of the first end edge, a second flap portion extending outwardly relative to its planar body and consisting of the second end edge, and a third flap portion extending outwardly relative to its planar body and consisting of the first side edge of the first panel;
   a second panel having a planar body which includes a first end edge, a second end edge, a first side edge, a second side edge, a longitudinal axis extending between the first end edge and the second end edge, an axial length dimension measured along its longitudinal axis from the first end edge to the second end edge, a transverse axis extending between the first side edge and the second side edge, a transverse width dimension measured along the transverse axis from the first side edge to the second side edge;
   the second panel having a first flap portion extending outwardly relative to its planar body and consisting of the first end edge, a second flap portion extending outwardly relative to its planar body and consisting of the second end edge, and a third flap portion extending outwardly relative to its planar body and consisting of the first side edge of the second panel, the first panel and the second panel being equal in axial length dimensions and equal in transverse width dimensions;

the first panel and the second panel being nested together such that at least the third flap portion of the first panel and the third flap portion of the second panel are bent 90 degrees and the third flap portion of the first panel overlaps with the third flap portion of the second panel;

the first panel and the second panel being securely connected together through a welding process applied to at least the overlapped third flap portions of the first panel and the second panel;

the first panel and the second panel being co-extensive with each other along the longitudinal axes of the panels and co-extensive with each other along the transverse axes of the panels, with the second side edge of the first panel and the second side edge of the second panel forming an opening;

an anchor bar located in the opening formed by the first panel and the second panel and having a plurality of spaced-apart slots; and a plurality of anchor elements secured to the anchor bar and extending into one of the spaced-apart slots defined in the anchor bar.

2. The burn barrier unit of claim 1, wherein the first flap portion and the second flap portion of the first panel and the first flap portion and second flap portion of the second panel are bent 90 degrees, and wherein the first flap portion of the first panel overlaps with the first flap portion of the second panel, and the second flap portion of the first panel overlaps with the second flap portion of the second panel; and wherein the first panel and the second panel are further connected together through a welding process applied to the overlapped first flap portions and the overlapped second flap portions of the first and second panels thereby forming a closed top and a closed bottom along the transverse axis of the burn barrier unit.

3. The burn barrier unit of claim 1, wherein the first flap portion and the second flap portion of the first panel and the first flap portion and the second flap portion of the second panel are bent 180 degrees such that the first flap portion and the second flap portion of the first panel and the first flap portion and the second flap portion of the second panel extend parallel to the longitudinal axis of its respective panel thereby forming an opened top and an opened bottom along the transverse axis of the burn barrier unit.

4. The burn barrier unit of claim 1, wherein the first panel and the second panel are made of a A36 mild steel.

5. The burn barrier unit of claim 1, wherein the plurality of anchor elements are scaffold knuckles, and wherein the burn barrier unit further comprises a handle for easy transporting of the burn barrier unit.

6. The burn barrier unit of claim 1, wherein each panel is made of carbon steel, has an approximate length of 5 to 6 feet, an approximate width of about 13 to 14 inches, and an approximate thickness of about 2 to 3 inches.

7. The burn barrier unit of claim 1, wherein the anchor bar is welded to the second side edge of the first panel and to the second side edge of the second panel at locations which are spaced-apart by about 12 inches.

8. The burn barrier unit of claim 1, wherein the anchor bar is a flat metal strip having a length equal to the length of the first panel and the second panel, and having a width of about 1 inch and a thickness of about ¼ inch.

9. A burn barrier unit, comprising:
a rectangular enclosure, the rectangular enclosure comprising:
a first panel;
a second panel connected to the first panel to form a longitudinal opening along a longitudinal wall thereof;
an anchor bar welded within the longitudinal opening formed by the first panel and the second panel, the anchor bar having at least two spaced-apart slots;
at least two anchor elements, one secured within one of the slots of the two spaced-apart slots for securing the rectangular enclosure to a support.

10. The burn barrier unit of claim 9, wherein the rectangular enclosure is made of carbon steel and measures approximately 5 to 6 feet long, about 13 to 14 inches wide, and about 2 to 3 inches thick.

11. The burn barrier unit of claim 9, wherein the anchor bar is a flat metal strip being about 1 inch wide and about ¼ inch thick.

12. The burn barrier unit of claim 9 wherein the anchor elements are scaffold knuckles, and wherein the burn barrier unit further comprises a handle for easy transport of the barrier unit.

13. The burn barrier unit of claim 9, wherein the rectangular enclosure measures about 64 inches long, about 13 inches wide, and about 2 inches thick.

* * * * *